Feb. 27, 1934.  J. G. DINTILHAC  1,949,009
THERMOSTATIC RADIATOR CONTROL
Filed Oct. 11, 1932   3 Sheets-Sheet 1

Feb. 27, 1934.　　　J. G. DINTILHAC　　　1,949,009
THERMOSTATIC RADIATOR CONTROL
Filed Oct. 11, 1932　　　3 Sheets-Sheet 2
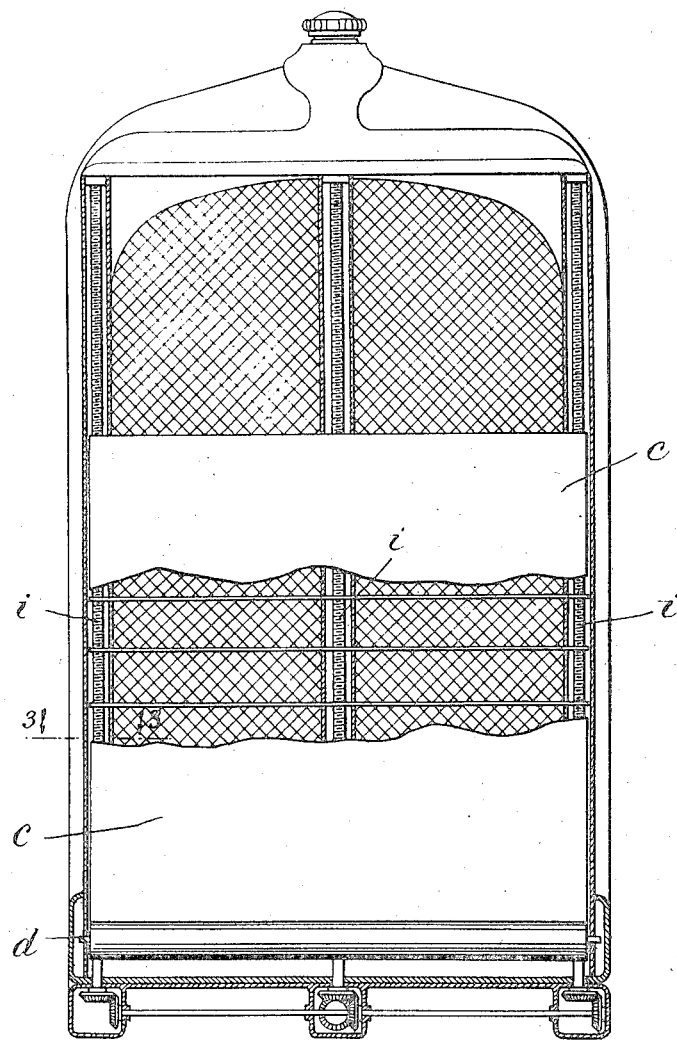
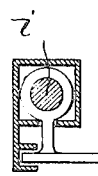
Inventor
Jean Georges Dintilhac
Attorney:

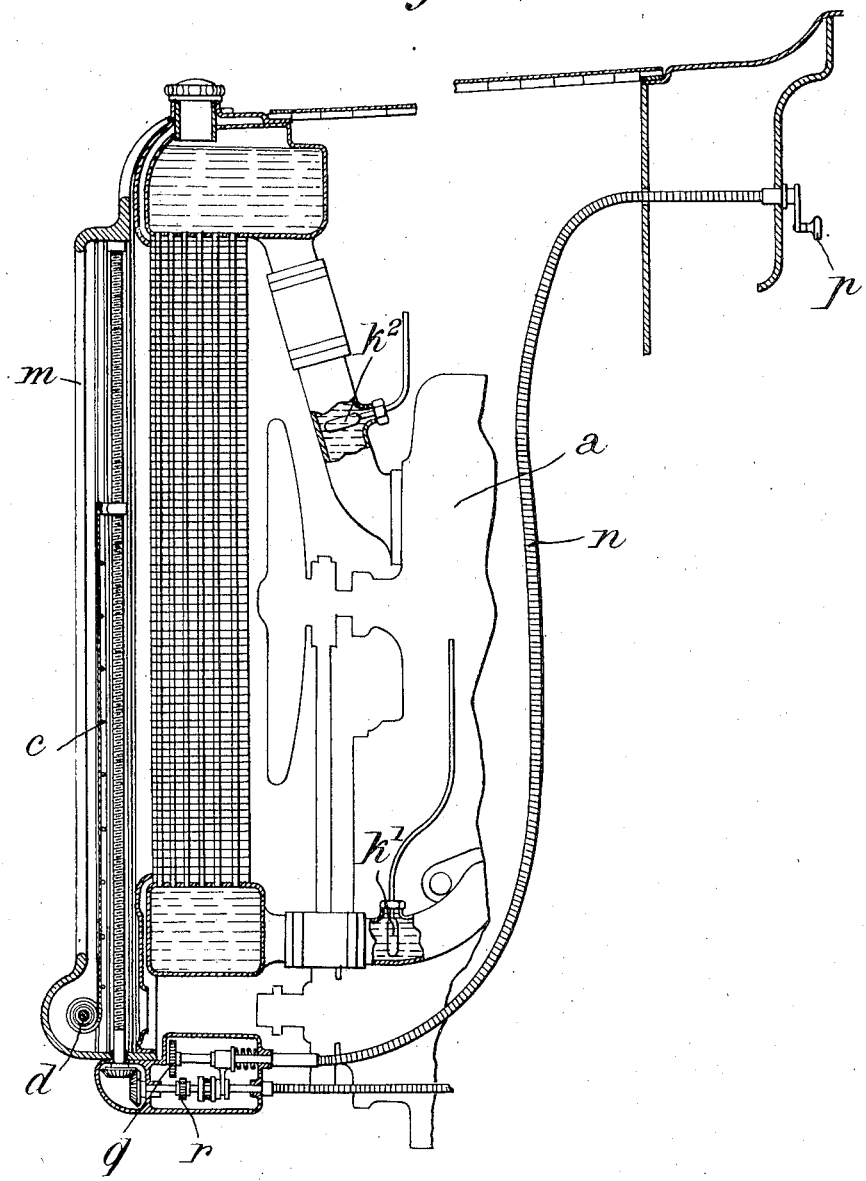

Patented Feb. 27, 1934

1,949,009

UNITED STATES PATENT OFFICE

1,949,009

THERMOSTATIC RADIATOR CONTROL

Jean Georges Dintilhac, Paris, France, assignor to Society "Yacco S. A. F.," Paris, France Application October 11, 1932, Serial No. 637,349
In Belgium August 23, 1932

2 Claims. (Cl. 236—35)

REISSUED

The present invention relates to thermostatic radiator controls, and, more particularly, to those of the type designed to be used with aeroplane and automobile motors.

It is becoming more and more the practice to provide automobile radiators with curtains, shutters and equivalent structures destined to limit or increase the radiator surface receiving air. However, these curtains or equivalent structures are generally hand operated.

One of the objects of the present invention is to provide means for automatically actuating radiator curtains or shutters in accordance with variations in temperature of the cooling water inside the radiator.

Other objects will appear in the course of the detailed description now to be given with reference to the accompanying drawings, in which:

Figure 2 is a front view, partially in section, of the radiator assembly shown in Figure 1;

Figure 3 is a section taken on line 3—3 of Figure 2;

Figure 4 represents, in a manner similar to Figure 1, a second form of the invention.

Figure 1:
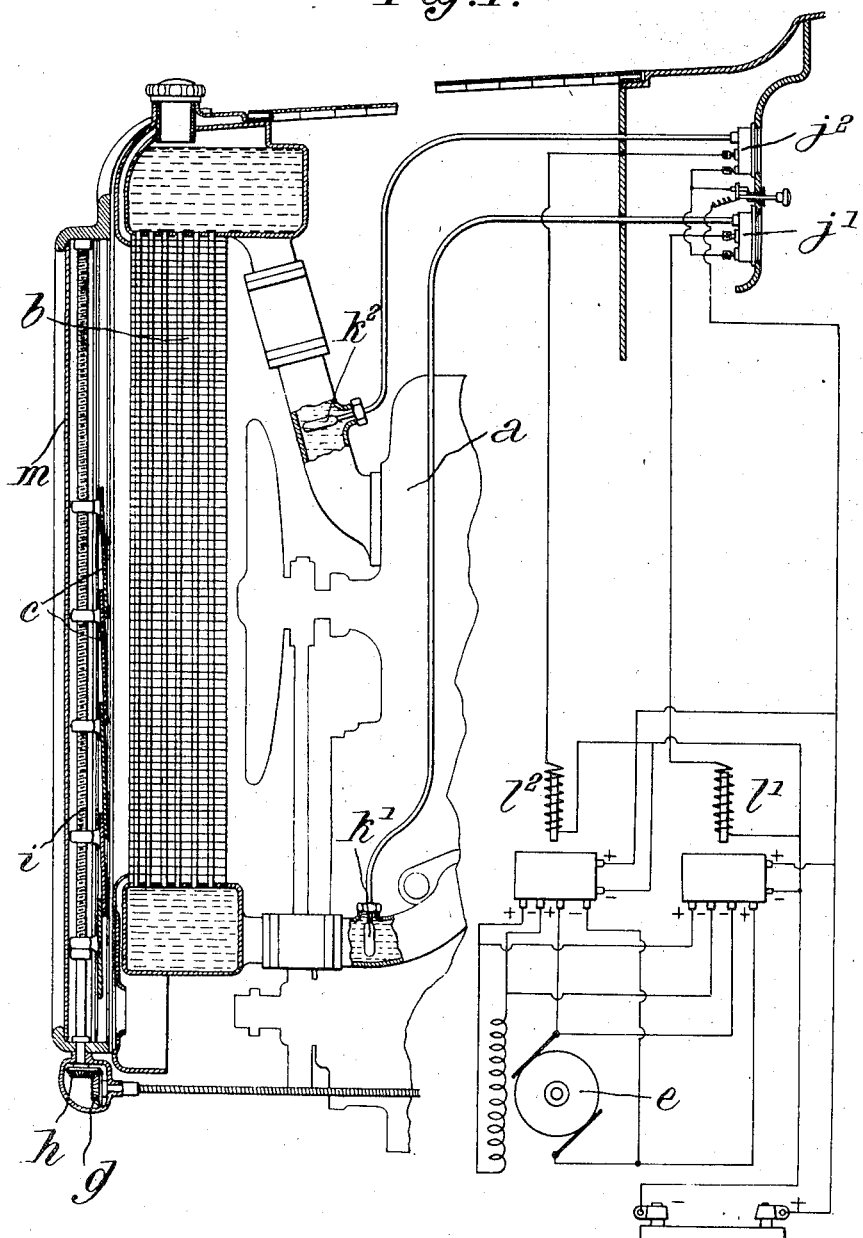
Figure 1 is a side elevation, partially in section, of one illustrative embodiment of the invention.

Referring to Figures 1 to 3 of the drawings, there is shown a motor block $a$ provided with a water jacket communicating at its upper and lower portions, in the usual way, with a radiator of conventional design $b$. The amount of air drawn through radiator $b$ is regulated by means of a plurality of shutter sections $c$ each provided with a threaded nut (or a plurality of threaded nuts) engaging with threaded shafts $i$, the latter being rotatable in opposite directions by a reversible motor $e$ through the intermediary of bevel gears $g$, $h$ and appropriate flexible or rigid shafts. Motor $e$ is controlled by a pair of thermostats $k^1$ and $k^2$ (thermometers, preferably of the water vapor type) each acting to close switches $j^1$ or $j^2$ respectively when the temperature of the water in contact with element $k^1$ falls below a predetermined temperature $t^1$ or that in contact with element $k^2$ surpasses a predetermined $t^2$. Each of these switches is in circuit with solenoids or relays $l^1$ and $l^2$ acting to control rotation of motor $e$ in one direction or the other. Current is supplied to the various electric circuits and to the motor by a battery $f$ and the assembly is completed by a grille $m$ protecting shutter $c$.

The manner in which the hereinabove described assembly operates is practically evident from the description thereof. Assuming the vehicle to be at rest and shutter $c$ in lowered (open) position, motor $e$ may be set in motion by means of a hand operated switch (not shown) combined with switch $j^1$. The raising of the shutter will reduce the effective cooling surface of the radiator and thus raise the temperature of the water circulating therethrough. When thermometer $k^1$ registers temperature $t^1$, switch $j^1$ opens and motor $e$ stops turning. If the temperature of the cooling water then continues to rise so as to bring thermometer $k^2$ to temperature $t^2$, switch $j^2$ will close, and motor $e$ will rotate in the opposite direction to lower shutters $c$. It will thus be seen that motor $e$ will act to lower or raise shutter $c$ so as to maintain the temperature of the cooling water between predetermined limits $t^1$ and $t^2$.

In the variant shown in Figure 4, shutter $c$ is replaced by an equivalent curtain $c$ wound on a spring actuated roller $d$ tending to oppose the lifting action of threaded shafts $i$. The rest of the assembly remains the same and need not be described. If, for any reason, it be desired to raise or lower curtain $c$, this may be done by means of a crank $p$ connected to a flexible shaft $n$, the latter being capable of acting to move a pair of pinions $q$ and $r$ into or out of engagement with one another. Obviously, this latter device may be fitted to the radiator assembly shown in Figure 1.

While I have described what I deem to be practical and efficient embodiments of my invention, it should be well understood that I do not wish to be limited thereto as there might be changes made in the arrangement, disposition and shape of the parts without departing from the principle of my invention as comprehended within the scope of the appended claims, for instance electric motor $e$ has been shown only as an example of a motor capable of actuating the shutter.

In the claims that follow the word "shutter" is to be taken as covering generically curtains $c$ in Fig. 4, shutters $c$ in Fig. 1, or equivalent elements slidably, rotatably or otherwise movably mounted adjacent a radiator and having the same function.

What I claim is:—

1. In combination with a motor provided with a radiator adapted to contain a cooling fluid, a threaded shaft, a shutter provided with a nut threadedly engaging with said shaft, said shutter being positioned to move in front of said radiator, a motor connected in driving relation to said threaded shaft, a thermometer positioned to respond to variations in the temperature of the cooling fluid circulating through said radiator, and an electric switch controlled by said thermometer and controlling said motor.

2. In combination with a motor provided with a radiator adapted to contain a cooling fluid, a threaded shaft, a shutter provided with a nut threadedly engaging with said shaft, said shutter being positioned to move in front of said radiator, an electric motor connected in driving relation to said threaded shaft, a thermometer positioned to respond to variations in the temperature of the cooling fluid circulating through said radiator, and an electric switch controlled by said thermometer and controlling said electric motor.

JEAN GEORGES DINTILHAC.